United States Patent
Chang et al.

(10) Patent No.: US 8,743,172 B2
(45) Date of Patent: Jun. 3, 2014

(54) IMAGE CAPTURING FOR VIDEO CONFERENCE SYSTEM

(75) Inventors: Chia-Yuan Chang, Tao Yuan Shien (TW); Chih-Wei Sung, Tao Yuan Shien (TW); Juin-Yi Huang, Tao Yuan Shien (TW); Yu-Shan Hsu, Tao Yuan Shien (TW); Ting-Han Huang, Tao Yuan Shien (TW); Tong-Ming Hsu, Tao Yuan Shien (TW); Wan-Chi Liu, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 221 days.

(21) Appl. No.: 13/542,626

(22) Filed: Jul. 5, 2012

(65) Prior Publication Data

US 2013/0106979 A1    May 2, 2013

(30) Foreign Application Priority Data

Nov. 2, 2011   (TW) .............................. 100139907 A

(51) Int. Cl.
*H04N 7/15* (2006.01)
(52) U.S. Cl.
CPC ...................................... *H04N 7/15* (2013.01)
USPC ................... 348/14.08; 348/14.01; 348/14.02
(58) Field of Classification Search
CPC ........... H04N 7/14; H04N 7/15; H04N 7/148; H04N 7/147; H04M 11/00
USPC ..................... 348/14.01–14.16; 370/260–261; 709/204
See application file for complete search history.

(56) References Cited

U.S. PATENT DOCUMENTS 8,325,213 B2 * 12/2012 Lamb et al. ................. 348/14.01
2003/0025786 A1 * 2/2003 Norsworthy ............... 348/14.08

* cited by examiner

*Primary Examiner* — Melur Ramakrishnaiah
(74) *Attorney, Agent, or Firm* — McClure, Qualey & Rodack, LLP

(57) ABSTRACT

A video conference system built in an internet protocol (IP) network is provided. The system has a multimedia capturing unit, a DECT telephone, and a video conference terminal apparatus. The DECT telephone is utilized to perform video conferencing with the video conference terminal apparatus by receiving and transmitting sounds. The DECT telephone is further utilized to control the video conference terminal apparatus to capture a target image in the video signals from other users in the video conference. The video conference terminal apparatus updates the phonebook image in the phonebook database thereof with the target image.

20 Claims, 6 Drawing Sheets

IMAGE CAPTURING FOR VIDEO CONFERENCE SYSTEM

CROSS REFERENCE TO RELATED APPLICATIONS

This Application claims priority of Taiwan Patent Application No. 100139907, filed on Nov. 2, 2011, the entirety of which is incorporated by reference herein.

BACKGROUND OF THE INVENTION

1. Field of the Invention

The present invention relates to video conferences, and in particular relates to a video conference system and method thereof using a DECT phone for communications.

2. Description of the Related Art

In recent years, video conferencing has become an important way to communicate between two remote users due to the development of network technologies and video compression technologies. In addition, the coverage area of wired and wireless networks has become very wide, and thus video communications using the internet protocol (IP) network is widely used. Although video conference services are provided by 3G cellular networks (e.g. the video phone protocol 3G-324M using the communications network), the popularity thereof is minimal as the coverage area is limited and communications fees for services are very expensive. Thus, video conferencing using the 3G cellular network is not popular. Generally, it is necessary for a user to own a dedicated video conference system for convenience to conduct video conferencing with other users. However, video conference systems in the market are generally equipped with a camera, a microphone, and/or a remote controller, but the microphone is usually fixed and the remote controller may be limited to cover only a certain area, which may cause inconvenience for users in some conditions (e.g. the user needs to walk around).

BRIEF SUMMARY OF THE INVENTION

A detailed description is given in the following embodiments with reference to the accompanying drawings.

In an exemplary embodiment, a video conference system built in an internet protocol (IP) network is provided. The system comprises: a multimedia capturing unit configured to capture video and output a first video signal; a digital enhanced cordless telecommunications (DECT) telephone configured to receive sounds and output a first audio signal; and a video conference terminal apparatus, comprising: an audio processing unit configured to encode the first audio signal to a first audio stream; a video processing unit configured to encode the first video signal to a first video stream; and a network processing unit configured to convert the first audio stream and the first video stream to a first network packet, and transmit the first network packet to the IP network, wherein when the network processing unit receives a second network packet from a phone number of the IP network, the audio processing unit and the video processing unit generates a second audio signal and a second video signal according to the second network packet, respectively, wherein the audio processing unit plays the second audio signal on the DECT telephone and the video processing unit displays the second video signal on a display apparatus; an image processing unit configured to receive the second video signal, and convert the second video signal to a first image; and a first phonebook database configured to store the phone number and a phonebook image corresponding to the phone number, wherein the DECT telephone is further configured to control the image processing unit to select a target area in the first image corresponding to the second video signal, control the video processing unit to display the target area in the second video signal, and control the image processing unit to capture a first target image of the target area from the first image and update the phonebook image corresponding to the phone number in the first phonebook database.

In another exemplary embodiment, a video conference terminal apparatus applied in a video conference system built in an internet protocol (IP) network is provided. The apparatus comprises: an audio processing unit configured to encode the first audio signal received by a DECT telephone to a first audio stream; a video processing unit configured to encode the first video signal generated by a multimedia capturing device to a first video stream; a network processing unit configured to convert the first audio stream and the first video stream to a first network packet and transmit the first network packet to the IP network. When the network processing unit receives a second network packet from a phone number of the IP network, the audio processing unit and the video processing unit generate a second audio signal and a second video signal according to the second network packet, respectively. The audio processing unit plays the second audio signal on the DECT telephone and the video processing unit displays the second video signal on a display apparatus. An image processing unit is configured to receive the second video signal, and convert the second video signal to a first image. A first phonebook database is configured to store the phone number and a phonebook image corresponding to the phone number, wherein the DECT telephone is further configured to control the image processing unit to select a target area in the first image corresponding to the second video signal, control the video processing unit to display the target area in the second video signal, and control the image processing unit to capture a first target image of the target area from the first image and update the phonebook image corresponding to the phone number in the first phonebook database.

In yet another exemplary embodiment, A video conference method applied in a video conference system built in an internet protocol (IP) network is provided. The video conference system comprises a multimedia capturing unit, a digital enhanced cordless telecommunications (DECT) telephone, and a video conference terminal apparatus. The video conference terminal apparatus comprises an audio processing unit, a video processing unit, a network processing unit, an image processing unit and a first phonebook database. The method comprises the following steps: The multimedia capturing unit outputs a first video signal. The DECT telephone outputs a first audio signal. The audio processing unit encodes the first audio signal to a first audio stream. The video processing unit encodes the first video signal to a first video stream. The network processing unit receives the first audio stream and the first video stream and converts the first audio stream and the first video stream to a first network packet and transmits the first network packet to the IP network. The audio processing unit and the video processing unit generate a second audio signal and a second video signal according to a second network packet, respectively, when the network processing unit receives the second network packet from the IP network. The audio processing unit plays the second audio signal on the DECT telephone. The video processing unit displays the second video signal on a display apparatus. The image processing unit receives the second video signal and converts the second video signal to a first image. The DECT telephone controls the image processing unit to select a target area in the first image corresponding to the second video signal, controls the video processing unit to display the target area in the second video signal, and controls the image processing unit to capture a first target image of the target area from the first image. The image processing unit updates the phonebook image corresponding to the phone number in the first phonebook database.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
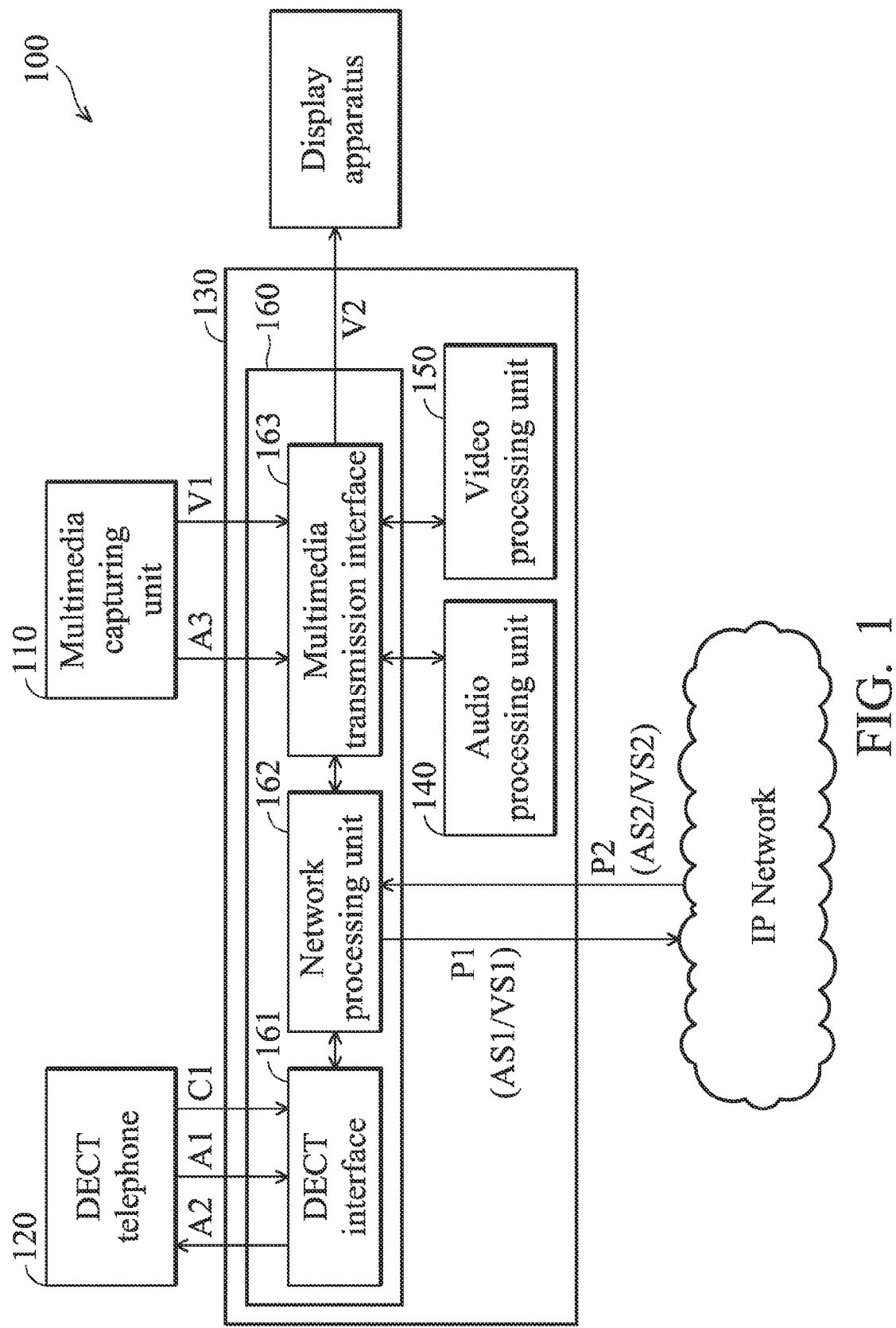
FIG. 1 illustrates a block diagram of the video conference system according to an embodiment of the invention.

FIG. 1 illustrates a block diagram of the video conference system according to an embodiment of the invention. The video conference system 100 may comprise a multimedia capturing unit 110, a digital enhanced cordless telecommunications telephone (DECT telephone hereafter) 120, and a video conference terminal apparatus 130. The video conference terminal apparatus 130 is configured to connect with another video conference terminal apparatus to exchange video signals and audio signals though an IP network (e.g. local area network (LAN)), a radio telecommunications network, or a public switched telephone network, and the details will be described in the following sections. The multimedia capturing unit 110 can be a light-sensitive component (e.g. a CCD or CMOS sensor), configured to receive the images of a user and output a video signal V1 according to the images. The DECT telephone 120 is configured to receive the audio signal from a remote user through the video conference terminal apparatus 130, and play the audio signal. The multimedia capturing unit 110 may further comprise a microphone (not shown in FIG. 1), configured to receive sounds from the user, transmit the sounds of the user to the video conference terminal apparatus 130, and generate a control signal C1 to control the video conference terminal apparatus, wherein the sounds are further transmitted to a remote user by the video conference terminal apparatus 130, and the details thereof will be described later.

The video conference terminal apparatus 130, coupled to the multimedia capturing unit 110 and the DECT telephone 120, may comprise an audio processing unit 140, a video processing unit 150, and a network processing unit 160. The audio processing unit 140 is configured to receive the audio signal A1 output from the DECT telephone 120 through the network processing unit 160, and encode the audio signal A1 to an audio stream AS1. The video processing unit 150 is configured to receive the video signal V1 (and/or the audio signal A3) from the multimedia capturing unit 110 through the network processing unit 160, and encode the video signal V1 to a video stream VS1. The network processing unit 160 may further convert the video stream VS1 and the audio stream AS1 to a network packet P1, and transmit the network packet P1 to another video conference terminal apparatus through an IP network for exchanging the network packets, thereby conducting a video conference.

The network processing unit 160 may comprise a digital enhanced cordless telephone interface (DECT interface hereafter) 161, a network processing unit 162, and a multimedia transmission interface 163. The DECT telephone 120 may communicate with and transmit data to the video conference terminal apparatus 130 through the DECT interface 161 with the DECT protocol. The network processing unit 162 is configured to receive the video stream VS1 and the audio stream AS1 from the video processing unit 150 and the audio processing unit 140, respectively, and encode the video stream VS1 and the audio stream AS1 to a network packet P1, which is further transmitted to the video conference terminal apparatuses of other users in the IP network. The network processing unit 162 is compatible with various wired/wireless communications protocols, such as the local area network (LAN), the intranet, the internet, the radio telecommunications network, the public switched telephone network, Wifi, the infrared ray, and Bluetooth, etc., but the invention is not limited thereto. The network processing unit 162 may further control the real-time media sessions and coordinate the network transfer flows between each user in the video conference. The multimedia transmission interface 163 is compatible with various transmission interfaces, such as USB and HDMI, for transmitting and receiving the video/audio signals.

Figure 2:
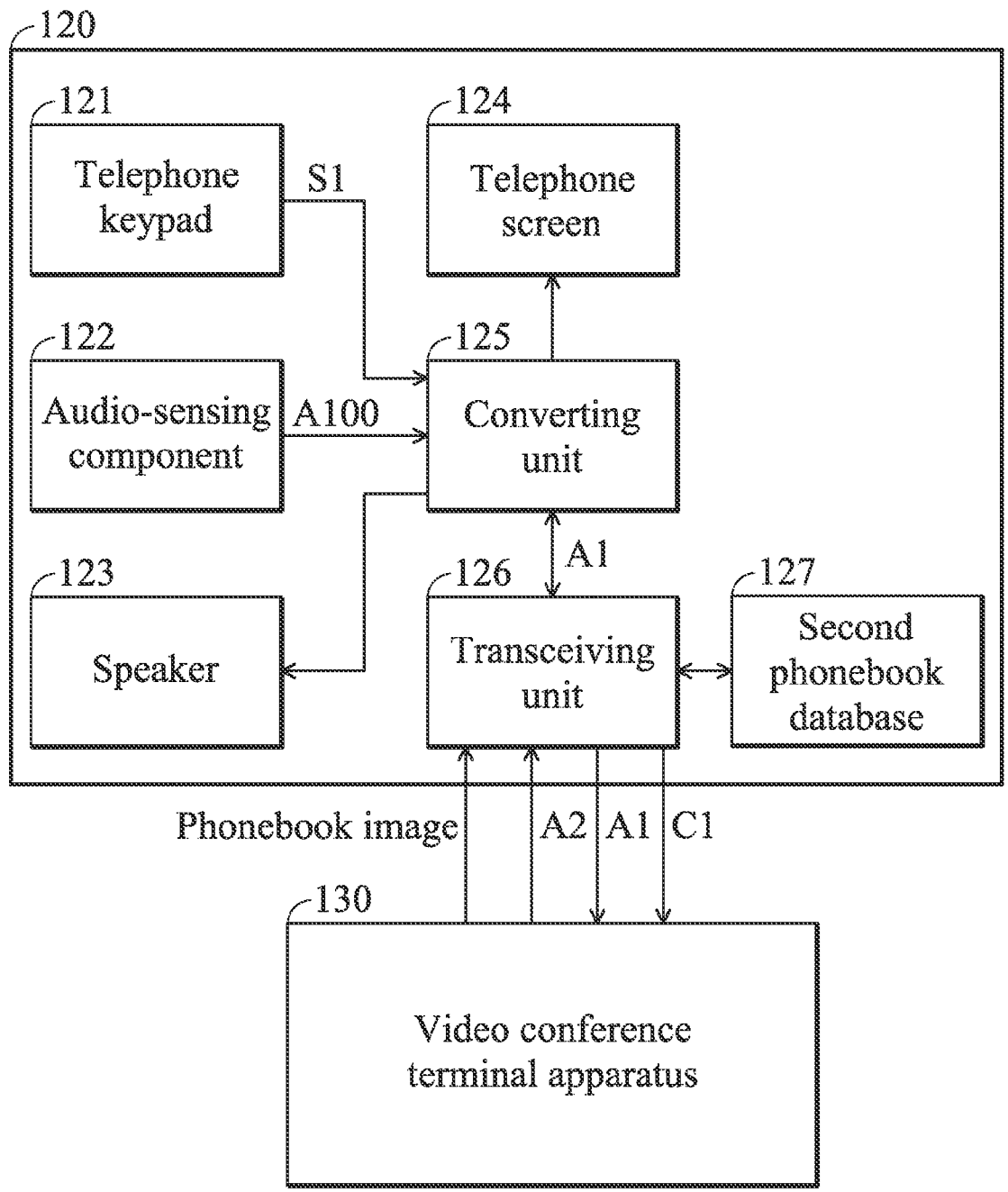
FIG. 2 illustrates a block diagram of the DECT telephone according to an embodiment of the invention.
Figure 3:
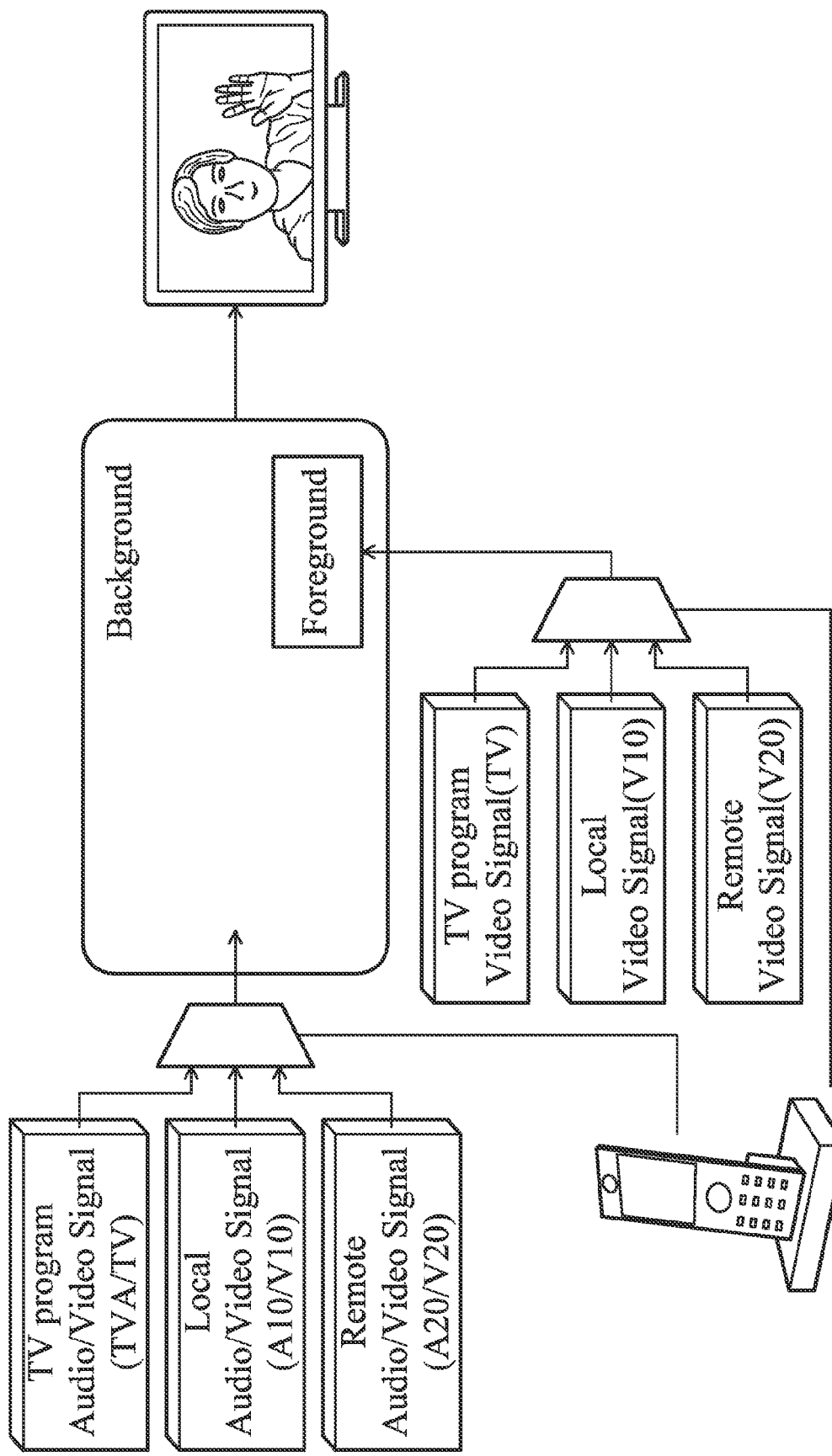
FIG. 3 illustrates a diagram of the picture-in-picture modes of the video conference terminal apparatus controlled by the DECT telephone according to an embodiment of the invention.
Figure 4:
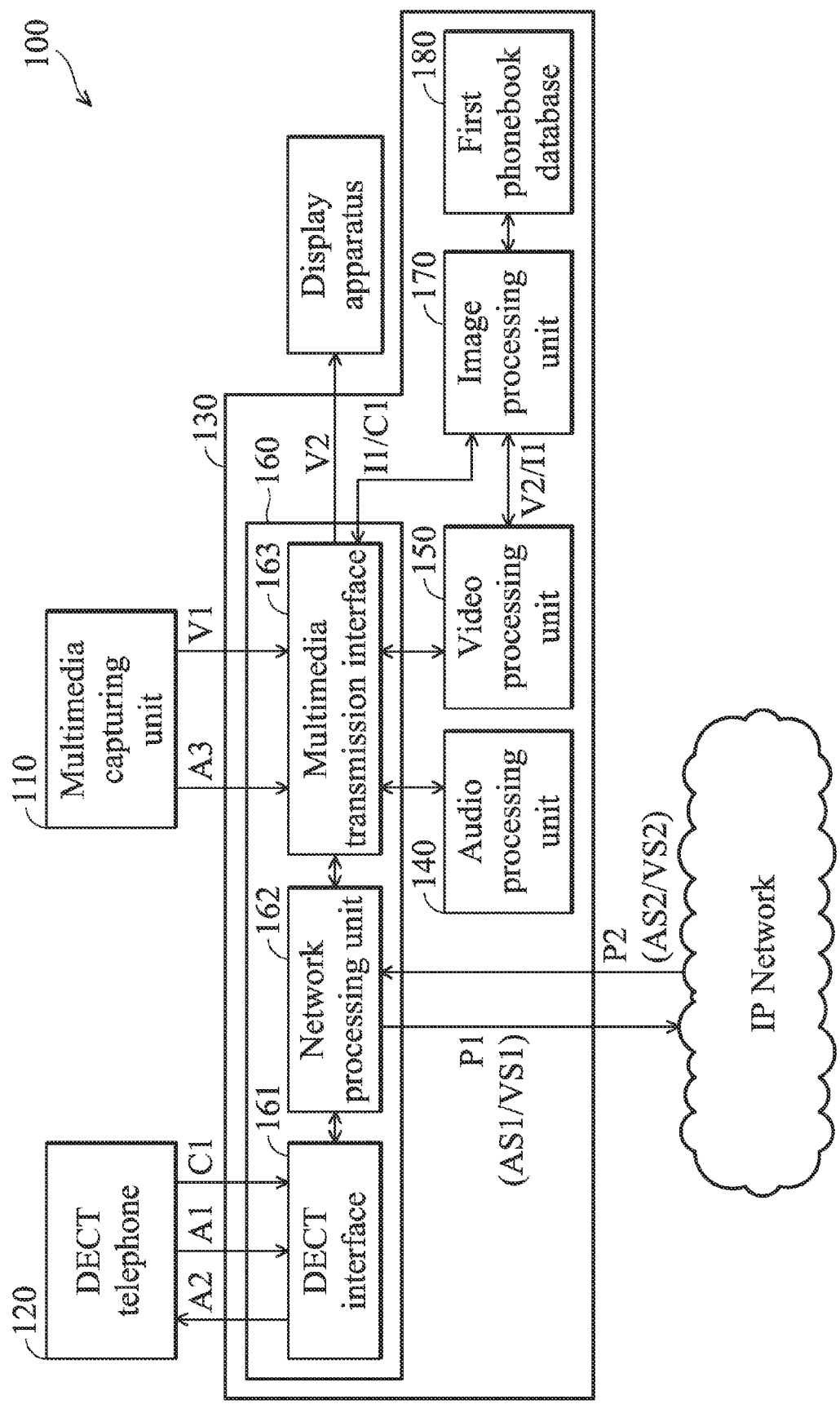
FIG. 4 illustrates a block diagram of the video conference terminal apparatus according to another embodiment of the invention.

As illustrated in FIG. 2, the DECT telephone 120 may comprise a telephone keypad 121, an audio-sensing component 122, a speaker 123, a telephone screen 124, a converting unit 125, a transceiving unit 126 and a second phonebook database 127. The telephone keypad 121 may comprise a numeric keypad (i.e. numpad) and telephone function buttons. A user may control the DECT telephone 120 by the telephone keypad 121, and control the video conference terminal apparatus 130 by the DECT telephone 120. For example, the user may operate the DECT telephone 120 by the telephone keypad 121, and the telephone keypad 121 may output a control signal S1 to the converting unit 125. The audio-sensing unit 122, such as a microphone, is configured to receive sounds of the user, and output an audio signal A100. The converting unit 125 is configured to receive the audio signal A100 and the control signal S1, and convert the audio signal A100 and the control signal S1 to the audio signal A1 and the control signal C1, respectively. Then, the transceiving unit 126 may transmit the audio signal A1 and the control signal C1 to the video conference terminal apparatus 130 with the DECT protocol to communicate and transfer data. In an embodiment, the DECT telephone 120 may further receive the user interface information encoded with the DECT protocol from the video conference terminal apparatus 130 through the transceiving unit 126, and display the user interface information, which is decoded by the converting unit 125, on the telephone screen 124. The second phonebook database 127 is configured to store a plurality of phone numbers and phonebook images (e.g. thumbnail images).

Referring to FIG. 1, the audio processing unit 140 is an audio codec (i.e. audio encoder/decoder), configured to receive the audio signal A1 from the DECT telephone 120 through the DECT interface 161, and encode the received audio signal A1 to the audio stream AS1. The audio processing unit 160 may also decode the audio stream AS1 from the other user in the video reference, transmit the audio signal A2 decoded from the audio stream AS2 to the DECT telephone 120 through the DECT interface 161, and display the audio signal A1 on the speaker 123.

The video processing unit 150 may be a video codec (i.e. video encoder/decoder), configured to receive the video signal V1 from the multimedia capturing unit 110, and encode the video signal V1 to generate a video stream VS1. The video processing unit 150 may further transmit the video stream VS1 and the audio stream AS1 to the video conference terminal apparatus of another user in the video conference through the network processing unit 162. When the network processing unit 162 receives the network packet P2 from the other user in the video conference through the IP network, the audio processing unit 140 and the video processing unit 150 may further decode the audio stream AS2 and the video stream VS2 in the network packet P2, respectively, to generate the audio signal A2 and the video signal V2. The audio signal A2 is played on the DECT telephone 120, and the video signal V2 is displayed on a display apparatus. It should be noted that the video processing unit 150 and the audio processing unit 140 can be implemented by hardware or software.

In another embodiment, the user may control the video conference terminal apparatus 130 by using the telephone keypad 121 of the DECT telephone 120, such as dialing the telephone numbers of other users in the video conference, controlling the angle of the camera, or alternating the settings of the screen. Specifically, the DECT telephone 120 may transmit the control signal to the video conference terminal apparatus 130 through the DECT interface 161 with the DECT protocol. The connection between the video conference terminal apparatus 130 and the multimedia capturing unit 110 can pass through the multimedia transmission interface 163, such as a wired interface (e.g. USB or HDMI) or a wireless interface (e.g. Wifi). The video conference terminal apparatus 130 can be connected to a display apparatus (e.g. a LCD TV) through the multimedia transmission interface 163, such as the HDMI interface or Widi (Wireless Display) interface, thereby the video screens of other users in the video conference and/or the control interface of the video conference terminal apparatus 130 can be displayed on the display apparatus, but the invention is not limited thereto.

In an embodiment, if the user A wants to conduct a video conference with the user B, the user A may use the DECT telephone 120 of the video conference terminal apparatus 130 to dial the telephone number of the video conference terminal apparatus 130 of the user B. Meanwhile, the video conference terminal apparatus 130 of the user A may receive the control message from the DECT telephone 120 through the DECT interface 161, and transmit the control message to the user B. When the video conference terminal apparatus 130 of the user B receives the phone call from the user A, the user B may respond to the phone call. Meanwhile, a video call can be built between the users A and B through the respective video conference terminal apparatus 130. The user A may use the DECT telephone 120 to capture the sounds thereof, and use the multimedia capturing unit 110 to capture the images thereof. Then, the audio processing unit 140 may receive the captured sounds of the user A through the DECT interface 161, and encode the captured sounds (i.e. the audio signal A1) to an audio stream AS1. The video processing unit 150 may encode the captured images of the user A (i.e. the video signal V1) to the video stream VS1. The audio stream AS1 and the video stream VS1 is transmitted to the video conference terminal apparatus 130 of the user B through the video conference terminal apparatus of the user B. On the other hand, the video conference terminal apparatus of the user B may decode the received audio stream AS1 and the video stream VS1. Then, the user B may transmit the audio signal A1 after the decoding process to the DECT telephone 120 through the DECT interface 161, thereby playing the audio signal A1. The user B may also display the video signal V1 after the decoding process on a display apparatus through the multimedia transmission interface 163 of the video conference terminal apparatus 130. It should be noted that the user B may also use the same procedure performed by the user A for exchanging video/audio signals to conduct the video conference.

In yet another embodiment, the multimedia capturing unit 110 may further comprise a microphone (not shown in FIG. 1) for capturing the sounds of the user, and outputting an output signal A3 according to the captured sounds. For example, referring to the procedure of the aforementioned embodiment, the user A may use the DECT telephone 120 or the microphone of the multimedia capturing unit 110 to capture the sounds thereof. The encoding process and transmission process of the audio/video signals is the same as those of the aforementioned embodiment. Then, the video conference terminal apparatus 130 of the user B may receive the audio stream AS1 and the video stream VS1 from the user A, which are decoded to generate the audio signal A1 and the video signal V1, respectively. The video conference terminal apparatus 130 of the user B may further transmit the audio signal A1 and the video signal V1 after the decoding process to a display apparatus (e.g. a LCD TV) through the multimedia transmission interface 163 (e.g. HDMI), thereby displaying the audio signal A1 and the video signal V1. Thus, the user B may hear the sounds of the user A and view the images of the user A on the display apparatus.

In another embodiment, when the user A is viewing a TV program, there may be three different kinds of screens to be displayed, such as the screen of the TV program, the remote user B (remote screen), and the local user A (local screen). Meanwhile, the user A may adjust the picture-in-picture (PIP) mode of the screen displayed on the video conference terminal apparatus 130 by utilizing the buttons on the DECT telephone 120, thereby the screens from different sources can be arranged in different layouts. Thus, the user A may view the TV program while conducting the video conference. For example, given that the local video signal, the remote video signal, the TV program video signal are V10, V20 and TV, respectively, the video conference terminal apparatus 130 may define various PIP modes, such as: (1) defining the TV program video signal TV as the background, and defining the local video signal V10 as the foreground; (2) defining the TV program video signal TV as the background, and defining the remote video signal V20 as the foreground; (3) defining the remote video signal V20 as the background, and defining the TV program video signal TV as the foreground; (4) defining the remote video signal V20 as the background, and defining the local video signal V10 as the foreground; (5) defining the local video signal V10 as the background, and defining the TV program video signal TV as the background; (6) defining the local video signal V10 as the background, and defining the remote video signal V20 as the foreground; (7) only defining the TV program video signal; (8) only defining the remote video signal V20; or (9) only defining the local video signal V10, etc., but the invention is not limited thereto. The display mode of the video conference terminal apparatus of the invention may also be a picture-by-picture (PBP) mode or a splitscreen mode, etc. In an embodiment, the local video signal V10, local audio signal A10, the remote video signal V20, the remote audio signal A20 may be V1, A1, V2, and A2, respectively.

Further, when the multimedia capturing unit 110 captures the local video signal V10, the local video signal V10 is directly transmitted to the video conference terminal apparatus 130. When the video conference terminal apparatus 130 receives the video stream of the TV program and the video stream of the remote screen from the network processing unit 162, the TV program video signal TV and the remote video signal V20 decoded from the video streams can be transmitted to the video conference terminal apparatus 130. In another embodiment, the video conference terminal apparatus 130 may further comprise a signal switching processing unit (not shown in FIG. 1), configured to coordinate switching of video/audio signals from different sources, and synchronize the video/audio signals. For example, given that the local audio signal, the remote audio signal and the TV program audio signal are A10, A20, and TVA, respectively, and the PIP mode set by the user A is "(3) defining the remote video signal V20 as the background, and defining the TV program video signal TV as the foreground", and the signal switching processing unit may enlarge the remote video signal V20 to be a background screen, and shrink the TV program video signal TV to be a foreground screen, as illustrated in FIG. 5. Meanwhile, the audio signal played by the display apparatus is the remote audio signal A20. That is, the audio signal heard by the user is synchronous to the audio signal of the background screen. This embodiment merely describes the operation procedure of the display modes in the video conference terminal apparatus 130, but the invention is not limited thereto.

In another embodiment, the video conference terminal apparatus 130 may further comprise an image processing unit 170 and a first phonebook database 180. The image processing unit 170 is configured to receive the second video signal (e.g. the video signal V2) from the video processing unit 150, and generate a first image I1 according to the second video signal. The first phonebook database 180 is configured to store a plurality of phone numbers and corresponding phonebook images (e.g. thumbnail images). It should be noted that, the second network packet P2 from the IP network may comprise a corresponding phone number, and the control signal from the DECT telephone 120 may comprise a coordinate and a motion vector utilized to control the image processing unit 170 to select a target area in the first image I1 corresponding to the second video signal V2 (e.g. the user may press the direction buttons to alternate the position, and press the "OK" button to select the target area), and control the video processing unit 150 to display the target area in the second video signal V2, thereby controlling the image processing unit 170 to capture the target area in the first image I1 corresponding to the second video V2 to generate a target image. Then, the image processing unit 150 may update the phonebook image corresponding to the phone number in the first phonebook database 180 according to the generated target image.

In yet another embodiment, the DECT telephone 120 may comprise a second phonebook database 127, and the transceiving unit 126 may synchronously receive the phonebook image corresponding to the phone number from the first phonebook database 180, and update the phonebook image corresponding to the phone number in the second phonebook database 127.

It should be noted that the video conference terminal apparatus 130 may further receive multiple remote video signals (e.g. the first/second remote video signals) from the IP network, and different remote video signals may have a corresponding phone number. The DECT telephone 120 may further control the video processing unit 150 to display the target area in the first remote video signal or the second remote video signal. In addition, the target image captured by the image processing unit 170 may also have a corresponding phone number, so that the image processing unit 170 may update the phonebook image corresponding to the phone number in the first phonebook database 180 according to the target image.

Figure 5A:
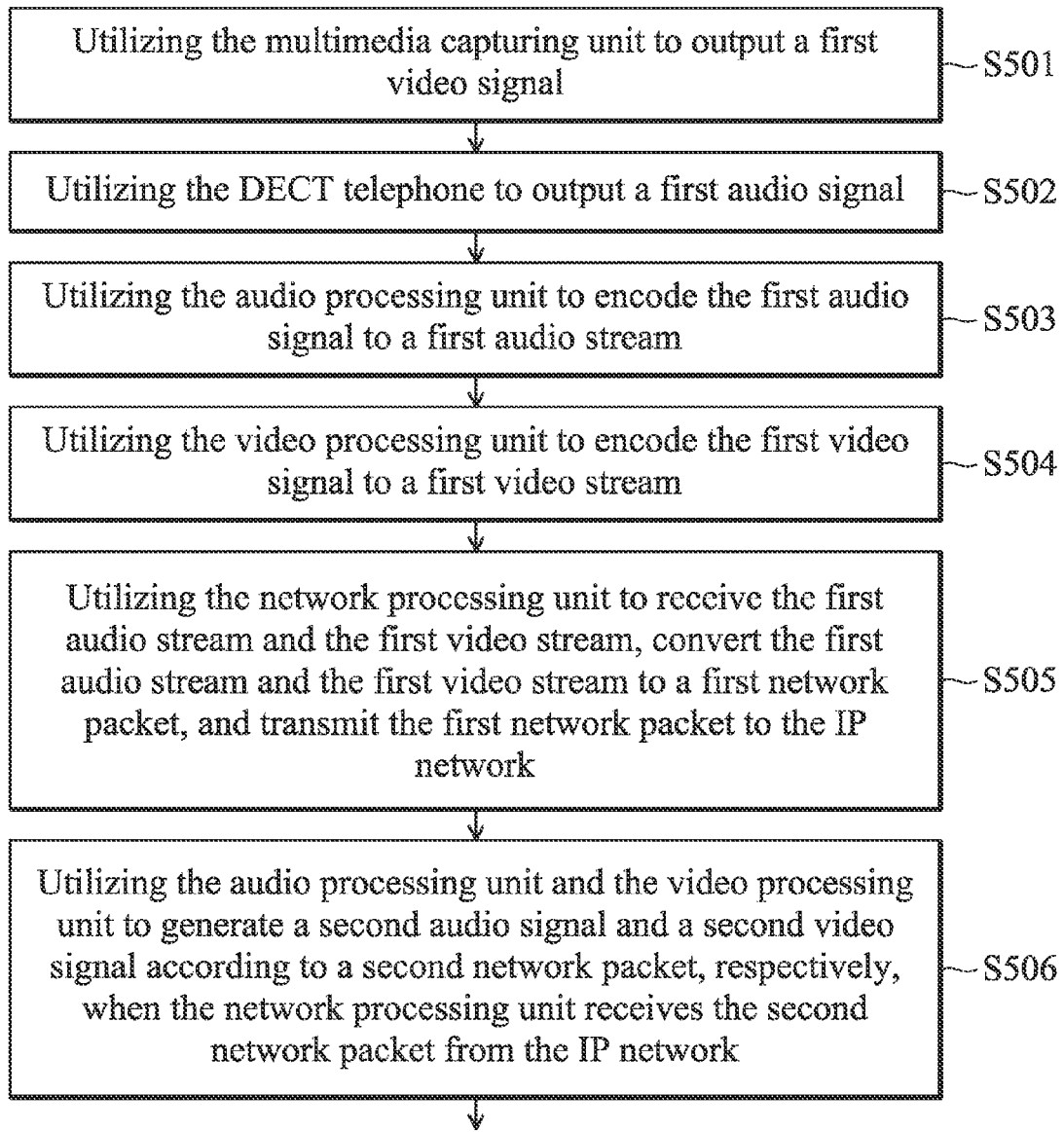
FIGS. 5A-5B illustrate a flow chart of the image capturing method applied in the video conference according to an embodiment of the invention.
Figure 5A:
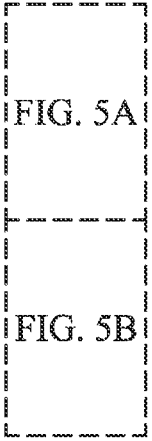
Figure 5B:
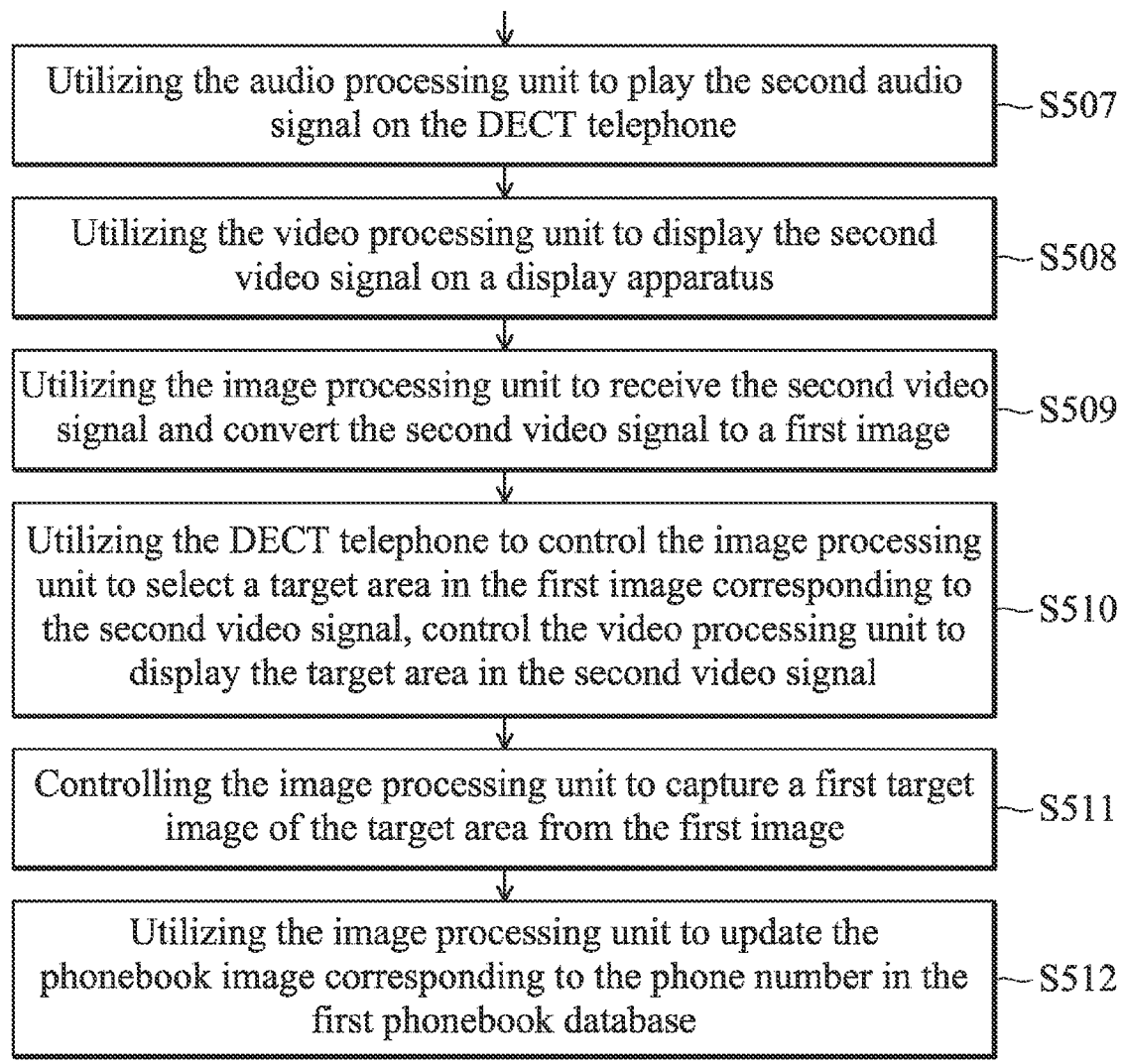

FIGS. 5A~5B illustrate a flow chart of the image capturing method applied in a video conference according to an embodiment of the invention, wherein the image capturing method is applied to the video conference system and the video conference terminal apparatus built on the IP network. In step S501, the user may utilize the multimedia capturing device 110 to capture the image thereof and output a first video signal (e.g. the video signal V1). In step S502, the user may utilize the DECT telephone 120 to capture the voices thereof and output a first audio signal (e.g. the audio signal A1). In step S503, the audio processing unit 140 is utilized to encode the first audio signal to a first audio stream (e.g. the audio stream AS1). In step S504, the video processing unit 150 is utilized to encode the first video signal (e.g. the video signal V1) to a first video stream (e.g. the video stream VS1). In step S505, the video conference terminal apparatus 130 may utilize the network processing unit 160 thereof to receive the first audio stream and the first video stream, convert the first audio stream and the first video stream to a first network packet (P1), and transmit the first network packet to the IP network. In step S506, when the network processing unit 160 receives a second network packet (P2) comprising a second audio stream (AS2) and a second video stream (VS2), the audio processing unit 140 and the video processing unit 150 may decode the second audio stream (AS2) and the second video stream (VS2) to generate a second audio signal (A2) and a second video signal (V2), respectively. In step S507, the audio processing unit 140 may play the second audio signal (A2) through the DECT telephone 120. In step S508, the video processing unit 150 may display the second video signal (V2) on a display apparatus. In step S509, the image processing unit 170 may receive the second video signal (V2) and convert the second video signal (V2) to a first image (I1). In step S510, the DECT telephone 120 may transmit the control signal C1 to the video conference terminal apparatus 130 to control the image processing unit 170 to select a target area in the first image (I1) corresponding to the second video signal (V2), and control the video processing unit 150 to display the target area in the second video signal (V2). In step S511, the image processing unit 170 may capture a target image of the target area from the first image (I1). In step S512, the image processing unit 170 may update a phonebook image corresponding to the phone number in the first phonebook database 180.

For those skilled in the art, it should be appreciated that the embodiments of the present invention may describe different implementations of the invention, and these implementations of the video conference system and the video conference terminal apparatus can be collocated with each other. The video conference system 100 can be utilized with a general DECT telephone, an image capturing apparatus, and the video conference terminal apparatus to perform video conferencing with other users, thereby achieving convenience and lower cost.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video conference system, built in an internet protocol (IP) network, comprising:
    a multimedia capturing unit configured to capture video and output a first video signal;
    a digital enhanced cordless telecommunications (DECT) telephone configured to receive sounds and output a first audio signal; and
    a video conference terminal apparatus, comprising:
        an audio processing unit configured to encode the first audio signal to a first audio stream;
        a video processing unit configured to encode the first video signal to a first video stream; and
        a network processing unit configured to convert the first audio stream and the first video stream to a first network packet, and transmit the first network packet to the IP network, wherein when the network processing unit receives a second network packet from a phone number of the IP network, the audio processing unit and the video processing unit generates a second audio signal and a second video signal according to the second network packet, respectively, wherein the audio processing unit plays the second audio signal on the DECT telephone and the video processing unit displays the second video signal on a display apparatus;
        an image processing unit configured to receive the second video signal, and convert the second video signal to a first image; and
        a first phonebook database configured to store the phone number and a phonebook image corresponding to the phone number,
        wherein the DECT telephone is further configured to control the image processing unit to select a target area in the first image corresponding to the second video signal, control the video processing unit to display the target area in the second video signal, and control the image processing unit to capture a first target image of the target area from the first image and update the phonebook image corresponding to the phone number in the first phonebook database.

2. The video conference system as claimed in claim 1, wherein the video processing unit further generates user interface information, and displays the user interface information on a display screen of the DECT telephone.

3. The video conference system as claimed in claim 1, wherein the multimedia capturing unit is further configured to receive sounds and output a third audio signal, wherein the audio processing unit further encodes the third audio signal to a second audio stream and the network processing unit further converts the second audio stream and the first video stream to a third network packet and transmits the third network packet to the IP network.

4. The video conference system as claimed in claim 1, wherein when the network processing unit receives a third network packet from a second phone number of the IP network, the audio processing unit and the video processing unit may respectively generate a third audio signal and a third video signal according to the third network packet, and the audio processing unit plays the third audio signal through the DECT telephone, and the video processing unit displays the second video signal and the third video signal simultaneously on the display apparatus.

5. The video conference system as claimed in claim 4, wherein the DECT telephone further comprises:
    a telephone keypad configured to be inputted with a plurality of control signals;
    a converting unit configured to convert the plurality of control signals to a packet; and
    a transceiving unit configured to transmit the packet to the video conference terminal apparatus, wherein the video processing unit, the audio processing unit and the image processing unit are controlled by the plurality of control signals.

6. The video conference system as claimed in claim 5, wherein the plurality of control signals further control the image processing unit to receive the third video signal and convert the third video signal to a second image, control the video processing unit to display a second target area in the third video signal, and control the image processing unit to capture a second target image of the second target area in the second image and update a second phonebook image corresponding to the second phone number in the first phonebook database.

7. The video conference system as claimed in claim 6, wherein the DECT telephone further comprises a second phonebook database, and the transceiving unit further receives the phone number and the phonebook image in the first phonebook database simultaneously to update the second phonebook database.

8. A video conference terminal apparatus, applied in a video conference system built in an internet protocol (IP) network, the apparatus comprising:
    an audio processing unit configured to encode the first audio signal received by a DECT telephone to a first audio stream;
    a video processing unit configured to encode the first video signal generated by a multimedia capturing device to a first video stream;
    a network processing unit configured to convert the first audio stream and the first video stream to a first network packet, and transmit the first network packet to the IP network, wherein when the network processing unit receives a second network packet from a phone number of the IP network, the audio processing unit and the video processing unit generate a second audio signal and a second video signal according to the second network packet, respectively, wherein the audio processing unit plays the second audio signal on the DECT telephone and the video processing unit displays the second video signal on a display apparatus;

an image processing unit configured to receive the second video signal, and convert the second video signal to a first image; and a first phonebook database configured to store the phone number and a phonebook image corresponding to the phone number, wherein the DECT telephone is further configured to control the image processing unit to select a target area in the first image corresponding to the second video signal, control the video processing unit to display the target area in the second video signal, and control the image processing unit to capture a first target image of the target area from the first image and update the phonebook image corresponding to the phone number in the first phonebook database.

9. The video conference terminal apparatus as claimed in claim 8, wherein the video processing unit further generates user interface information, and displays the user interface information on a display screen of the DECT telephone.

10. The video conference terminal apparatus as claimed in claim 8, wherein the multimedia capturing unit is further configured to receive sounds and output a third audio signal, wherein the audio processing unit further encodes the third audio signal to a second audio stream and the network processing unit further converts the second audio stream and the first video stream to a third network packet and transmits the third network packet to the IP network.

11. The video conference terminal apparatus as claimed in claim 8, wherein when the network processing unit receives a third network packet from a second phone number of the IP network, the audio processing unit and the video processing unit may respectively generate a third audio signal and a third video signal according through the DECT telephone, and the video processing unit displays the third video signal simultaneously on the display apparatus.

12. The video conference terminal apparatus as claimed in claim 8, wherein the video conference terminal apparatus further receives a control signal from the DECT telephone to control the image processing unit to receive the third video signal and convert the third video signal to a second image, control the video processing unit to display a second target area in the third video signal, and control the image processing unit to capture a second target image of the second target area in the second image and update a second phonebook image corresponding to the second phone number in the first phonebook database.

13. The video conference terminal apparatus as claimed in claim 11, wherein the DECT telephone further comprises a second phonebook database and a transceiving unit, and the transceiving unit receives the phone number and the phonebook image in the first phonebook database simultaneously to update the second phonebook database.

14. A video conference method applied in a video conference system built in an internet protocol (IP) network, wherein the video conference system comprises a multimedia capturing unit, a digital enhanced cordless telecommunications (DECT) telephone, and a video conference terminal apparatus, and the video conference terminal apparatus comprises an audio processing unit, a video processing unit, a network processing unit, a image processing unit and a first phonebook database, the method comprising:

utilizing the multimedia capturing unit to output a first video signal;

utilizing the DECT telephone to output a first audio signal;

utilizing the audio processing unit to encode the first audio signal to a first audio stream;

utilizing the video processing unit to encode the first video signal to a first video stream;

utilizing the network processing unit to receive the first audio stream and the first video stream, convert the first audio stream and the first video stream to a first network packet, and transmit the first network packet to the IP network;

utilizing the audio processing unit and the video processing unit to generate a second audio signal and a second video signal according to a second network packet, respectively, when the network processing unit receives the second network packet from the IP network;

utilizing the audio processing unit to play the second audio signal on the DECT telephone;

utilizing the video processing unit to display the second video signal on a display apparatus;

utilizing the image processing unit to receive the second video signal and convert the second video signal to a first image;

utilizing the DECT telephone to control the image processing unit to select a target area in the first image corresponding to the second video signal, control the video processing unit to display the target area in the second video signal, and control the image processing unit to capture a first target image of the target area from the first image; and utilizing the image processing unit to update the phonebook image corresponding to the phone number in the first phonebook database.

15. The video conference method as claimed in claim 14, further comprising:

utilizing the video processing unit to generate user interface information, and display the user interface information on a display screen of the DECT telephone.

16. The video conference method as claimed in claim 14, further comprising:

utilizing the multimedia capturing unit to receive sounds and output a third audio signal;

utilizing the audio processing unit to encode the third audio signal to a second audio stream; and utilizing the network processing unit to convert the second audio stream and the first video stream to a third network packet, and transmit the third network packet to the IP network.

17. The video conference method as claimed in claim 14, further comprising:

utilizing the audio processing unit and the video processing unit to generate a third audio signal and a third video signal, respectively, according to a third network packet when the network processing unit receives the third network packet from the IP network;

utilizing the audio processing unit to play the third audio signal through the DECT telephone; and utilizing the video processing unit to display the second video signal and the third video signal on a display apparatus simultaneously.

18. The video conference method as claimed in claim 17, wherein the DECT telephone further comprises a telephone keypad, a converting unit, and a transceiving unit, and the method further comprises:

utilizing the telephone keypad to input a plurality of control signals;

utilizing the converting unit to convert the plurality of control signals to a packet; and utilizing the transceiving unit to transmit the packet to the video conference terminal apparatus, and control the video processing unit, the audio processing unit and the image processing unit by the plurality of control signals.

19. The video conference method as claimed in claim 18, further comprising:
- utilizing the plurality of control signals to control the image processing unit to receive the third video signal, and convert the third video signal to a second image;
- utilizing the plurality of control signals to control the video processing unit to display a second target area in the third video signal; and
- utilizing the plurality of control signals to control the image processing unit to capture a second target image of the second target area in the second image to update a second phonebook image corresponding to the second phone number in the first phonebook database.

20. The video conference method as claimed in claim 19, wherein the DECT telephone further comprises a second phonebook database, and the method further comprises:
- utilizing the transceiving unit to synchronously receive the phone number and the phonebook image in the first phonebook database to update the second phonebook database.

* * * * *